United States Patent [19]

Kijima et al.

[11] Patent Number: 5,716,443
[45] Date of Patent: Feb. 10, 1998

[54] SURFACE TREATING AGENT FOR COATING VEHICLES

[75] Inventors: Tetsuo Kijima, Tokyo; Makoto Miyazaki, Kanagawa-ken; Sachiko Yusa, Gunma-ken, all of Japan

[73] Assignees: Taiho Industries, Co., Ltd.; Toshiba Silicone Co., Ltd., both of Tokyo, Japan

[21] Appl. No.: 708,505

[22] Filed: Sep. 5, 1996

[30] Foreign Application Priority Data

Dec. 4, 1995 [JP] Japan .................................. 7-314986

[51] Int. Cl.$^6$ ........................................... C09G 1/04
[52] U.S. Cl. ........................................... 106/287.11
[58] Field of Search .................................. 106/287.11

[56] References Cited

U.S. PATENT DOCUMENTS

| | | | |
|---|---|---|---|
| 5,154,759 | 10/1992 | Cifuentes et al. | 106/287.11 |
| 5,326,387 | 7/1994 | Faber et al. | 106/287.12 |
| 5,330,787 | 7/1994 | Berlin et al. | 106/287.11 |

*Primary Examiner*—David Brunsman
*Attorney, Agent, or Firm*—Browdy and Neimark

[57] ABSTRACT

A surface treating agent for coating vehicles comprises an amino group-containing polyorganosiloxane represented by the general formula (1) below, an organic acid, polydimethylsiloxane having a viscosity at 25° C. of 5 to 300 cSt and an aqueous medium:

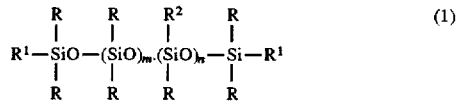

wherein R is a monovalent hydrocarbyl group having a carbon number of 1 to 20, $R^1$ is any of a monovalent hydrocarbyl group having a carbon number of 1 to 20, an alkoxy group having a carbon number of 1 to 6 or hydroxyl group, m is an integer of 10 to 1,000, n is an integer of 1 to 20, R each may be identical with or different from the other, and $R^1$ each may also be identical with or different from the other. $R^2$ is a substituent represented by the general formula (2) of:

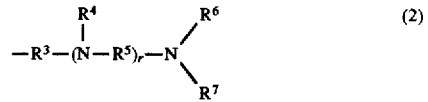

wherein $R^3$ and $R^5$ are a divalent hydrocarbyl group having a carbon number of 1 to 6, $R^4$, $R^6$ and $R^7$ are hydrogen atom or a monovalent hydrocarbyl group having a carbon number of 1 to 20, r is an integer of 0 to 3, $R^3$ and $R^5$ may be identical with or different from each other, $R^4$, $R^6$ and $R^7$ may also be identical with or different from one another.

11 Claims, No Drawings

SURFACE TREATING AGENT FOR COATING VEHICLES

BACKGROUND OF THE INVENTION

1. Field of the Invention

The present invention relates to a surface treating agent for coating vehicles such as automobiles, more particularly to a surface treating agent for coating vehicles, which can form a uniform coating film having a good water repellency and luster and a good durability in the water repellency and luster.

2. Description of Related Art

Hitherto, as surface treating agents for making a coating layer having a good water repellency or luster on vehicles such as automobiles there have been used a solvent-type surface treating agent comprising a natural or synthetic wax, such as carnauba wax, montan wax, paraffin wax, micro wax and polyethylene wax, and a silicone oil dissolved or dispersed in a medium, or an emulsion-type surface treating agent comprising the same components as mentioned above emulsified by adding thereto an emulsifying agent and water.

In order to provide improved water repellency, luster and workability, it has been considered that into the silicone oil are incorporated various organic-modified silicone oils. For example, there are known a solvent-type coated surface-protecting composition featured by comprising a wax, alkyl-modified silicone oil and volatile solvent and providing an excellent, coated surface-protecting and wiping property (see JP-A-62-132981), a solvent-type and emulsion-type water-repellent lustering agent obtained by dispersing a long chain alkyl group-modified silicone oil in any of a hydrocarbon solvent, silicone solvent and chlorinated hydrocarbon solvent and featured by having a well-balanced wiping workability and water repellency (see JP-A-4-363375), a solvent-type lustering agent obtained by comprising a silicone oil, petroleum solvent, ultrafine silica particles and amino-modified silicone oil and featured by having a good workability and providing a coating layer having a good transparency and luster (see JP-A-61-246274), an emulsion-type lustering agent obtained by dissolving in water an emulsion obtained by incorporating water and a surfactant into an isopropyl alcohol solution of an amino-modified silicone oil and a xylene solution of dimethyl silicone oil and featured by providing a coating layer having a good luster and water repellency (see JP-A-50-157288), an aqueous emulsion-type vehicle wax composition featured by containing an alcoholic solution of a specific cationic surfactant and an acetate of an amino-modified silicone oil, which may be used in a flowing manner when vehicle washed (see JP-A-1-163280), an emulsion-type water-repelling agent comprising an aqueous emulsion composition containing an organopolysiloxane having hydroxyl groups at both ends thereof, aminoalkyl group-containing silane and emulsifying agent and being free of metal corrosion and having a good workability and durability in water repellency (see JP-A-7-41757), and a solvent-type surface-protecting composition comprising a volatile silicone, amino-functional silicone and organopolysiloxane, which can be used on wet surfaces and provide luster and water repellency (see JP-A-7-109439).

However, of these water-repellent lustering agents, the solvent type is excellent in water repellency but poor in workability of wiping, etc., and the emulsion type is excellent in workability but poor in water repellency and further inadequate in lustering property in such a manner that whitening may often occur and also in durability of water repellency and lustering.

Furthermore, incorporation of an amino-modified silicone not in the vehicle-coating surface treating agent but in a water repellent for glass is known. For example, a water repellent for glass comprising an amino-modified polysiloxane, formic acid and any one of water and alcohol is known (see JP-A-7-41336).

However, since glass surfaces are different from surfaces of vehicles to be coated, the same effect is hardly expected between the water repellent for glass and the surface treating agent for vehicles. Furthermore, glass requires to be free of glare and have a good visibility but, on the other hand, vehicles require to have a good luster. Thus, the properties required by both are different from each other. Therefore, to apply the water repellent for glass to the surface treating agent for vehicles, further study is required.

SUMMARY OF THE INVENTION

One object of the present invention is to provide a surface treating agent for coating vehicles, which can easily be handled and provide a good luster, water repellency and durability of luster and water repellency.

The other objects will be understood from the description below.

In accordance with the present invention, the surface treating agent for coating vehicles is provided which comprises an amino group-containing polyorganosiloxane represented by the general formula (1) of:

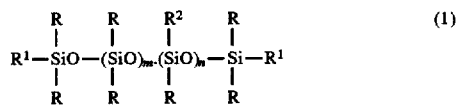

wherein R is a monovalent hydrocarbyl group having a carbon number of 1 to 20, $R^1$ is any of a monovalent hydrocarbyl group having a carbon number of 1 to 20, an alkoxy group having a carbon number of 1 to 6 or hydroxyl group, $R^2$ is a substituent represented by the general formula (2) of:

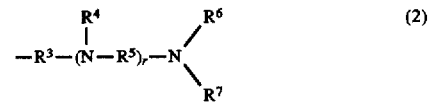

wherein $R^3$ and $R^5$ are a divalent hydrocarbyl group having a carbon number of 1 to 6, $R^4$, $R^6$ and $R^7$ are hydrogen atom or a monovalent hydrocarbyl group having a carbon number of 1 to 20, r is an integer of 0 to 3, $R^3$ and $R^5$ may be identical with or different from each other, R4, $R^6$ and $R^7$ may also be identical with or different from one another, m is an integer of 10 to 1,000, n is an integer of 1 to 20, R each may be identical with or different from the other, and $R^1$ each may also be identical with or different from the other, an organic acid, polydimethyl siloxane having a viscosity at 25° C. of 5 to 300 cSt and an aqueous medium.

DESCRIPTION OF PREFERRED EMBODIMENTS

The present invention will be in detail described below.

The surface treating agent for coating vehicles according to the present invention is substantially comprised of an amino group-containing polyorganosiloxane, organic acid, polydimethyl siloxane and aqueous medium.

Amino Group-Containing Polyorganosiloxane

The amino group-containing polyorganosiloxane (hereinunder often referred to as "component A") of the present invention is represented by the general formula (1) of:

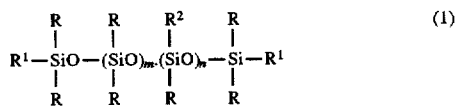

wherein R is a monovalent hydrocarbyl group having a carbon number of 1 to 20, $R^1$ is any of a monovalent hydrocarbyl group having a carbon number of 1 to 20, an alkoxy group having a carbon number of 1 to 6 or hydroxyl group, $R^2$ is a substituent represented by the general formula (2) of:

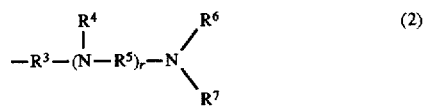

wherein $R^3$ and $R^5$ are a divalent hydrocarbyl group having a carbon number of 1 to 6, $R^4$, $R^6$ and $R^7$ are hydrogen atom or a monovalent hydrocarbyl group having a carbon number of 1 to 20, r is an integer of 0 to 3, $R^3$ and $R^5$ may be identical with or different from each other, $R^4$, $R^6$ and $R^7$ may also be identical with or different from one another, m is an integer of 10 to 1,000, n is an integer of 1 to 20, R each may be identical with or different from the other, and $R^1$ each may also be identical with or different from the other.

The example of R in the formula (1) may include an alkyl group such as methyl group, ethyl group, propyl group, isopropyl group, butyl group, hexyl group, heptyl group, octyl group and decyl group, dodecyl group, a cycloalkyl group such as cyclohexyl group and cycloheptyl group, an aryl group such as phenyl group and tolyl group, and an alkenyl group such as vinyl group, allyl group and propenyl group. Of these groups the alkyl group and aryl group are preferred since they have a good water repellency. In this case, R each may be different from the other, for example, one of R is an aryl group and the other is an alkyl group.

The example of $R^1$ in the formula (1) may include the same groups as R, methoxy group, ethoxy group, propoxy group, isopropoxy group, butoxy group and t-butoxy group. Of these groups a lower alkyl group, particularly an alkyl group having a carbon number of 1 to 5, phenyl group, and a lower alkoxy group having a carbon number of 1 to 5 are preferred since they provide a good storing stability. Particularly, methyl group, ethoxy group and ethoxy group are preferred. When $R^1$ is methyl group, methoxy group or ethoxy group, the advantages of the present invention are enhanced. $R^1$ each in the formula (1) may be identical with or different from the other, but $R^1$ all are preferably identical with one another.

The examples of $R^3$ and $R^5$ in the formula (2) may be various divalent hydrocarbyl groups having a carbon number of 1 to 6 represented by the formula of:

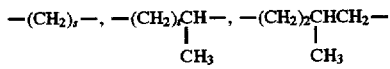

wherein s is an integer of 1 to 6, preferably 2 and 3, and t is an integer of 1 to 3.

The examples of $R^4$, $R^6$ and $R^7$ in the formula (2) may be hydrogen atom, various alkyl groups, cycloalkyl groups, aryl groups, alkenyl groups, which are the same as referred to above for group R in the formula (1). Of these hydrogen atom is preferred since it allows the water repellency to be maintained for a long period.

The examples of the substituents represented by the general formula (2) may be aminomethyl group, β-aminoethyl group, γ-aminopropyl group, δ-aminobutyl group, N-(β-aminoethyl)aminomethyl group and γ-(N-(β-aminoethyl)amino)propyl group. Accordingly, the amino group-containing polyorganosiloxanes having these substituents can be properly used.

The amino group-containing polyorganosiloxane preferably has a viscosity at 25° C. of 10 to 20,000 cSt, more preferably 100 to 5,000 cSt, particularly preferably 200 to 2,000 cSt. When the amino group-containing polyorganosiloxane having such a viscosity is used together with the polydimethyl siloxane mentioned below, the surface treating agent can be uniformly coated on a surface to be treated even on which droplets of water are present, because the agent and the droplets of water are properly compatible with each other. If the viscosity is less than 10 cSt, then the amount of polyorganosiloxanes containing no amino group is increased, so that a uniform layer is hardly formed. If the viscosity exceeds 20,000 cSt, then the compatibility of the agent with droplets of water is lowered, so that the agent is hardly spread in a uniform film on the surface to be treated. This is a cause for forming a non-uniform film.

The amino group-containing polyorganosiloxanes is added to the agent in an amount of normally 0.03 to 10 wt %, preferably 0.1 to 5 wt % based on the total weight of the agent.

Organic Acid

The organic acid used herein (hereinunder often referred to as "component B") is not limited. For example, a carboxylic acid, sulfonic acid, sulfinic acid, etc. can conveniently be used. These various organic acids may be used singly or in combination of two or more kinds thereof. As combination, two or more selected from the group consisting of carboxylic acids, sulfonic acids and sulfinic acids can be used. Of these acids the carboxylic acids are particularly preferred.

As the carboxylic acids reference may be made to a monovalent carboxylic acid such as formic acid, acetic acid, propionic acid, n-butyric acid, isobutyric acid, pivalic acid, valeric acid, isovaleric acid, caproic acid, 2-ethylbutyric acid, caprylic acid, oleic acid and lauric acid, a divalent carboxylic acid such as oxalic acid, malonic acid, succinic acid, glutaric acid, adipic acid, maleic acid and fumaric acid, an oxycarboxylic acid such as glycolic acid, lactic acid, malic acid, tartaric acid, gluconic acid and citric acid, or an aromatic carboxylic acid having an aromatic ring, e.g., benzen ring, such as phthalic acid, benzoic acid and salicylic acid.

In the present invention, these acids may be used singly or in combination of two or more thereof.

The carboxylic acid used herein is preferably a monovalent carboxylic acid represented by the formula of $R^8COOH$, wherein $R^8$ is hydrogen atom or a saturated or unsaturated aliphatic group having a carbon number of 1 to 17, preferably 1 to 10, more preferably 1 to 5, which may have hydroxyl group, and may include HCOOH, a divalent aliphatic carboxylic acid represented by the formula of $HOOCR^9COOH$, wherein $R^9$ is a saturated or unsaturated aliphatic group having a carbon number of 1 to 8, preferably 1 to 8, which may have hydroxyl group, or an aromatic carboxylic acid.

In other words, the carboxylic acid suitably used herein may include a saturated aliphatic monocarboxylic acid, saturated aliphatic hydrocarboxylic acid, saturated aliphatic dicarboxylic acid, and aromatic hydrocarboxylic acid.

It may be said that the carboxylic acid suitably used herein may include acetic acid, lactic acid, succinic acid and salicylic acid.

Thus, in accordance with the present invention, one of the organic acids, for example, a carboxylic acid may be used singly, or two or more organic acids, for example, carboxylic acids may be used.

The amount of component B added is not particularly limited, but preferably in the range of 1 to 50 parts by weight, particularly preferably 5 to 20 parts by weight, based on 100 parts by weight of component A.

When the amount of component B is within the range above, the excellent water repellency is stably maintained for a long period. In addition, the good handling property and good coating workability are achieved by combining component B with the other components. If the amount exceeds 50 parts by weight, human skin may disadvantageously be irritated or the coating film is apt to be damaged.

The amount of component B incorporated in the total of the surface treating agent for coating vehicles is normally in the range of 0.0003 to 4 wt %, preferably 0.0015 to 1.6 wt %.

Polydimethyl Siloxane

The polydimethyl siloxane (hereinunder often referred to as "component C") used herein has a viscosity at 25° C. of 5 to 300 cSt, preferably 10 to 200 cSt. The polydimethyl siloxane having this range of viscosity allows the treating agent to be adapted to water droplets, if any, on the surface of vehicles to be treated, so that the surface can be uniformly coated, when used together with component A. If the viscosity is less than 5 cSt, a uniform coating layer having a good water repellency is hardly obtained because the polydimetnyl siloxane is volatile. Further, if the viscosity exceeds 300 cSt, then the adaptability of the polydimethyl siloxane to water droplets becomes poor, which may cause unevenness to occur in the coating layer.

The amount of component C added is not particularly limited, but preferably 1 to 500 parts by weight, particularly 50 to 400 parts by weight, based on 100 parts by weight of component A. When the amount of component C is within the range above, the treating agent can be uniformly coated, allows the coating layer to have a good luster, and affords an excellent water repellency to the coating layer together with the other components. If the amount of component C is below the 1 part by weight, then the coating layer is so sticky that it may be apt to be stained. If the amount exceeds 500 parts by weight, the durability of water repellency is unpreferably reduced.

In addition, the amount of component C added is normally 0.0003 to 32 wt %, preferably 0.017 to 26 wt %, based on the total of the surface treating agent for coating vehicles.

Aqueous Medium

The aqueous medium (hereinunder referred to as "component D") used herein is water and/or an aqueous organic solvent.

As the aqueous organic solvent reference may be made to a monohydric or polyhydric alcohol such as methanol, ethanol, 2-propanol, ethylene glycol, propylene glycol or glycerine, a glycol ether such as ethylene glycol monomethyl ether, ethylene glycol monoethyl ether, ethylene glycol monobutyl ether, propylene glycol monomethyl ether, propylene glycol monoethyl ether, propylene glycol monobutyl ether, diethylene glycol methyl ether, diethylene glycol butyl ether, dipropylene glycol methyl ether, tripropylene glycol methyl ether or 3-mehyl-3-methoxybutan ol, an acetate such as ethylene glycol methyl ether acetate, ethylene glycol ethyl ether acetate, propylene glycol methyl ether acetate, propylene glycol ethyl ether acetate or 3-methyl-3-methoxybutyl acetate, or an alkanolamine such as triethanolamine, 2-(dimethylamino)ethanol or 2-(diethylamino)ethanol.

Furthermore, as an organic solvent which can be mixed in a relatively optional ratio with water may be used, for example, ketones or ethers. The ketones may be such as dimethyl ketone, diethyl ketone or methyl ethyl ketone. The ethers may be such as dioxanes or tetrahydrofurans.

Preferred aqueous mediums are water, lower alcohols, particularly alcohols having a carbon number of 1 to 5 and glycohol ether.

In the present invention, component D may be either water or the aqueous organic solvent, but a combination of water and the aqueous organic solvent. When the combined medium of water and the aqueous organic solvent is used, the aqueous organic solvents may be used singly or in combination thereof.

The amount of the component D added is not particularly limited, but it is normally in the range of 1,000 to 300,000 parts by weight, preferably 5,000 to 200,000 parts by weight, more particularly 5,000 to 100,000 parts by weight, based on 100 parts by weight of component A. When the amount of component D is within the range above, the surface treating agent can be well coated or sprayed on the surface to be treated, so that a uniform coating layer having a good water repellency can be obtained.

In other words, the amount of component D is normally in the range of 61 to 99.97 wt %, preferably 88.5 to 99.94 wt %, based on the total of the surface treating agent for coating vehicles.

Other Components

The surface treating agent for coating vehicles according to the present invention can exhibit the desired advantages with components A, B, C and D. However, other components may be added, if desired, as long as the other components do not damage the said advantages.

However, it is preferred that no surfactant is used in the present invention. If any surfactant is added to the surface treating agent of the present invention, adhesion of the coating layer becomes poor, so that durability of water repellency is insufficient, or whitening may occur, or lustering is poor. In other words, even if the surface treating agent for coating vehicles according to the present invention does not contain any surfactant, a good water repellency and luster can be obtained and maintained for a long period. In addition, the agent is highly dispersible.

As the other components may be added perfumes, antiseptics, optical stabilizers, rust preventives and ultraviolet-ray absorbers.

The perfumes reference may include natural or synthetic perfumes. The natural perfumes may include animal or vegetable perfumes. As the animal perfumes reference may be made to musk, civet, castor, ambergris, etc. As the vegetable perfumes reference may be made to an essential oil such as peppermint oil, lemon oil or rose oil, an absolute such as rose absolute, vanilla absolute or berublossom absolute, a resinoid such as benzoin resinoid, olibanum resinoid or oakmoss resinoid, an oleoresin such as vanilla oleoresin or ginger oleoresin, a tincture such as vanilla tincture or musk tincture, a balsam such as Peru balsam or Toru balsam, or a concrete such as rose concrete or oris concrete.

The synthetic perfumes reference can be obtained from petroleum, coal, natural gas or fatty and oil. For example, reference may be made to a floral perfume such as acetophenon, a pinaple perfume such as butylbutyrate, a jasmin perfume such as benzyl acetate or methyl hydrojasmonate, a banana perfume such as butyl acetate, a green perfume such as allylamyl glycolate, a rosinate perfume such as citronellol, citronellyl acetate or β-phenylethylalcohol, a strawberry perfume such as ethylmethylphenyl glycidate, a vanilla perfume such as vanillin or ethyl vanillin, a peach perfume such as γ-undecalactone, a coconut perfume such as γ-nonalactone, or a pineapple perfume such as isoamyl isovalerate.

As the antiseptic reference may be made to p-hydroxybenzoic acid, benzoic acid, sorbic acid, dehydroacetic acid, formic acid, salicylic acid, boric acid, vanilic acid, p- or o-chlorobenzoic acid, alkyl p-hydroxybenzoate, propionic acid, sulfurous acid, trichlorophenyl acetic acid, benzetonium chloride, benzalconium chloride, cetyltrimethyl ammonium chloride, cetylpyridium chloride, dimethyldidodecenyl ammonium chloride, tetramethylthiuramdisulfide, vanillin, ethylvanillin, phenolcresol, chlorothymol, methylchlorothymol, ethylchlorothymol, chlorobutanol, o-phenylphenol, dichlorophen, p-chloro-m-xylenol, p-chloro-m-cresol, dichloro-m-xylenol, pentachlorophenol or N,N-dimethyl-N'-phenyl-sulfamide.

The optical stabilizer reference may include metal complexes and hindered amines.

As the metal complex reference may be made to nickel [2,2'-thiobis(4-tertiaryoctyl)phenolate]normalbutylamine, nickel dibutyldithiocarbamate, nickel bis[o-ethyl-3,5-(di-t-butyl-4-hydroxybenzyl)]phosphate, cobalt dicyclohexyl dithiophosphate, [1-phenyl-3-methyl-4-decanonyl-pyrazoate(5)$_2$]nickel.

As the hindered amines reference may be made to bis(2,2,6,6-tetramethylpiperidinyl)sebacate.

The rust preventive reference may include an organic rust preventive and inorganic rust preventive.

As the organic preventive reference may be made to a carboxylic acid such as α-mercaptostearic acid, α-(2-carboxyphenoxy)stearic acid, a metal soap such as zinc laurylate or calcium ricinoleate, a sulfonate such as petroleum sulfonate or calcium dialkylnaphthalene sulfonate, an amine such as polyamine naphthalate or cyclodiaminealkylene carboxylic amide, an ester such as sorbitanmonoooleate or pentaerythritolmonoooleate.

As the inorganic rust preventive reference may be made to a phosphate such as a zinc dialkyldithiophosphate, or a nitrite such as isopropylamine nitrite.

The ultraviolet-ray absorber may include a benzophenone, salicylate, benzotriazole and acrylonitrile.

As the benzophenone ultraviolet-ray absober reference may be made to a monoxide such as 2-hydroxybenzophenone, a dioxide such as 2,4-dihydrobenzophenone, a trioxide such as 2,2',4-trihydroxybenzophenone and a tetraoxide such as 2,2',4,4'-tetrahydroxybenzophenone.

As the salicylate ultraviolet-ray absorber reference may be made to phenylsalicylate or 2,4-di-t-butylphenylsalicylate.

As the benzotriazole ultraviolet-ray absorber reference may be made to (2'-hydroxyphenyl)benzotriazole, (2'-hydroxy-5'-methylphenyl)benzotriazole or (2'-hydroxy-3'-t-butyl-5'-methylphenyl)-5-chlorobenzotriazole.

As the acrylonitrile ultraviolet-ray absorber reference may be made to ethyl-2-cyano-3,3'-diphenylacrylate or methyl-2-carbomethoxy-3-(paramethoxy)acrylate.

Preparation Method

The surface treating agent for coating vehicles according to the present invention can be prepared by mixing components A, B, C and D and, if necessary, the other components.

The mixing method is not particularly limited. The mixing may be carried out by a stirrer, colloid mill, homomixer, homogenizer, azihomomixer, combimixer or sand grinder, or a combination of one or more of these apparatuses. Furthermore, the mixing may be carried out at room temperature or an elevated temperature.

Surface Treating Method

The surface treating agent of the present invention is applied to the surface of vehicles by a sponge, cloth or brush, or a trigger system or sprayer system, during or immediately after washing of vehicles, and then washed down. The surface treating agent of the present invention is normally used as it is or in an original liquid, but in the case where the concentration of at least one of the components, particularly the amino group-containing polyorganosiloxane is high, the agent may be used in a diluted state, if desired. The amount of the agent used per one time varies depending upon the concentration of the primary component and the degree of luster on the coated surface of vehicles, but normally preferred to be 10 to 20 g per m$^2$ of the coated surface of vehicles.

The present invention will be illustrated below with reference to some examples, but should not be limited to the examples.

EXAMPLES 1 to 5

Surface treating agents for coating vehicles were prepared by uniformly mixing the indicated components in the indicated amounts through a homogenizer. The resulting agents were evaluated by the method as mentioned below. The results are shown in Table 1.

Surface Treating Method

The resulting agents were uniformly sprayed through a trigger pump onto the coated surface of a vehicle in a wet state immediately after the vehicle was washed with water, then an excess of the agent was washed down with tap water, and the vehicle was naturally dried.

Evaluation Items and Specification a) Luster: visually observed b) Evenness of luster: visually observed c) Initial water repellency: visually observed on the shape of water droplets d) Durability of water repellency: visually observed on the shape of water droplets after water was spread for a given period (30 seconds, 60 seconds and 90 seconds)

Criteria of Evaluation a) Luster:

A ··· Highly lustered as compared with non-lustered

B ··· Fairly lustered as compared with non-lustered

C ··· Equally or poorly lustered as compared with non-lustered b) Evenness of luster:

A ··· Less uneven or even

B ··· A little uneven

C ··· Apparently uneven c) Initial water repellency and durability thereof:

A ··· Almost all spherical water droplets

B ··· Both spherical and non-spherical water droplets

C ··· Almost all non-spherical water droplets

Components and Ratios Thereof

In Examples 1 to 5, "%" and "parts" both are on the basis of weight, and the viscosity is one at 25° C.

Example 1:

| Component A: | amino group-containing polyorganosiloxane (A-1) 0.98% kinematic viscosity: 1000 cSt | (100 parts) |
| --- | --- | --- |
| Component B: | acetic acid 0.10% | (10 parts) |
| Component C: | polydimethyl siloxane 0.98% kinematic viscosity: 20 cSt | (100 parts) |
| Component D: | ethyl alcohol 97.94% | (10,000 parts) |

Example 2:

| Component A: | amino group-containing polyorganosiloxane (A-2) 0.25% kinematic viscosity: 300 cSt | (100 parts) |
| --- | --- | --- |
| Component B: | acetic acid 0.01% | (5 parts) |
| Component C: | polydimethyl siloxane 0.05% kinematic viscosity: 100 cSt | (200 parts) |
| Component D: | water 86.84% diethyleneglycolmethylether 12.40% | (35,000 parts) (5,000 parts) |

Example 3:

| Component A: | amino group-containing polyorganosiloxane (A-1) 1.51% kinemaic viscosity: 1000 cSt | (100 parts) |
| --- | --- | --- |
| Component B: | succinic acid 0.30% | (20 parts) |
| Component C: | polydimethyl siloxane 7.55% kinematic viscosity: 250 cSt | (500 parts) |
| Component D: | water 45.32% glycerine 45.32% | (3,000 parts) (3,000 parts) |

Example 4:

| Component A: | amino group-containing polyorganosiloxane (A-2) 0.12% kinematic viscosity: 300 cSt | (100 parts) |
| --- | --- | --- |
| Component B: | oxalic acid 0.04% | (30 parts) |
| Component C: | polydimethyl siloxane 0.37% kinematic viscosity: 50 cSt | (300 parts) |
| Component D: | 2-propanol 99.47% | (80,000 parts) |

Example 5:

| Component A: | amino group-containing polyorganosiloxane (A-1) 0.07% kinematic viscosity: 1,000 cSt | (100 parts) |
| --- | --- | --- |
| Component B: | lactic acid 0.04% | (40 parts) |
| Component C: | polydimethyl siloxane 0.28% kinematic viscosity: 100 cSt | (400 parts) |
| Component D: | water 71.15% 2-propanol 28.47% | (100,000 parts) (80,000 parts) |

The structural formula of the amino group-containing polyorganosiloxane used in Examples 1 to 5 is as follows:

Amino group-containing polyorganosiloxane (A-1)

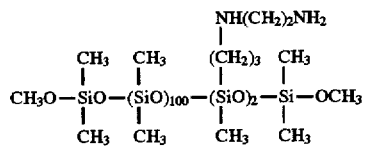

Amino group-containing polyorganosiloxane (A-2)

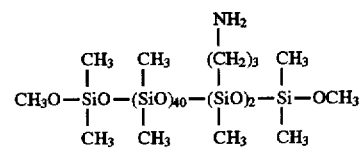

Comparative Example 1

A surface treating agent for coating vehicles was prepared in the same manner as mentioned in Example 1, except that the amino group-containing polyorganosiloxane was not contained. The resulting agent was evaluated in the same manner as mentioned in Example 1. The results are shown in Table 1.

Comparative Example 2

A surface treating agent for coating vehicles was prepared in the same manner as mentioned in Example 1, except that the polydimethylsiloxane was not contained. The resulting agent was evaluated in the same manner as mentioned in Example 1. The results are shown in Table 1.

Comparative Example 3

A surface treating agent for coating vehicles was prepared in the same manner as mentioned in Example 1, except that a polydimethylsiloxane having a viscosity of 500 cSt was contained. The resulting agent was evaluated in the same manner as mentioned in Example 1. The results are shown in Table 1.

Comparative Example 4

A surface treating agent for coating vehicles was prepared in the same manner as mentioned in Example 1, except that a polydimethylsiloxane having a viscosity of 2 cSt was contained. The resulting agent was evaluated in the same manner as mentioned in Example 1. The results are shown in Table 1.

Comparative Example 5

A surface treating agent for coating vehicles was prepared in the same manner as mentioned in Example 1, except that the acetic acid was replaced with hydrochloric acid. The resulting agent was evaluated in the same manner as mentioned in Example 1. The results are shown in Table 1.

Comparative Example 6

A surface treating agent for coating vehicles was prepared in the same manner as mentioned in Example 1, except that the ethyl alcohol was replaced with an isoparaffin medium. The resulting agent was evaluated in the same manner as mentioned in Example 1. The results are shown in Table 1.

TABLE 1

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Luster | A | A | A | A | A | B | C | A | C | B | A |
| Evenness | A | A | A | A | A | C | B | C | C | B | C |
| Initial water repellency | A | A | A | A | A | C | A | A | A | B | A |
| Durability of water repellency | | | | | | | | | | | |
| after 30 seconds | A | A | A | A | A | C | A | A | A | B | A |
| after 60 seconds | A | A | A | A | A | C | A | A | A | B | B |
| after 90 seconds | A | A | A | A | A | C | A | B | A | C | C |

As is seen from Table 1, the surface treating agent for coating vehicles according to the present invention allows the surface of vehicles to have a good water repellency and luster, and these characteristics are well maintained for a long period.

What is claimed is:

1. A surface treating agent for coating vehicles, which consists essentially of an amino group-containing polyorganosiloxane represented by the general formula (1) below, an organic acid, polydimethylsiloxane having a viscosity at 25° C. of 5 to 300 cSt and an aqueous medium:

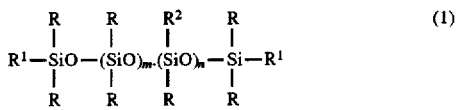   (1)

wherein R is a monovalent hydrocarbyl group having a carbon number of 1 to 20, $R^1$ is any of a monovalent hydrocarbyl group having a carbon number of 1 to 20, an alkoxy group having a carbon number of 1 to 6 or hydroxyl group, m is an integer of 10 to 1,000, n is an integer of 1 to 20, R each may be identical with or different from each other, and $R^1$ each may also be identical with or different from the other, $R^2$ is a substituent represented by the general formula (2) of:

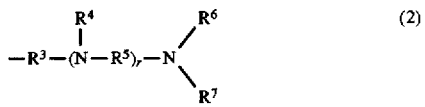   (2)

wherein $R^3$ and $R^5$ are a divalent hydrocarbyl group having a carbon number of 1 to 6, $R^4$, $R^6$ and $R^7$ are hydrogen atom or a monovalent hydrocarbyl group having a carbon number of 1 to 20, r is an integer of 0 to 3, $R^3$ and $R^5$ may be identical with or different from each other, $R^4$, $R^6$ and $R^7$ may also be identical with or different from one another, and optionally a surfactant.

2. The surface treating agent according to claim 1, wherein in said formula (1), R is an alkyl group or aryl group, $R^1$ is a lower alkoxy group having a carbon number of 1 to 5, and in said formula (2), $R^3$ and $R^5$ are a divalent hydrocarbyl group having a carbon number of 1 to 6 and represented by the formula of:

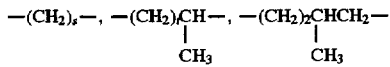

wherein s is an integer of 1 to 6, and t is an integer of 1 to 3, and $R^4$, $R^6$ and $R^7$ are hydrogen atom.

3. The surface treating agent according to claim 1, wherein said amino group-containing polyorganosiloxane has a viscosity at 25° C. of 10 to 20,000 cSt.

4. The surface treating agent according to claim 1, wherein said amino group-containing polyorganosiloxane has a viscosity at 25° C. of 100 to 5,000 cSt.

5. The surface treating agent according to claim 1, wherein said organic acid is at least one selected from the group consisting of carboxylic acids, sulfonic acids and sulfinic acids.

6. The surface treating agent according to claim 1, wherein said organic acid is at least one selected from the group consisting of monovalent carboxylic acids represented by the formula of $R^8COOH$, wherein $R^8$ is hydrogen atom or a saturated or unsaturated aliphatic group having a carbon number of 1 to 17, which may have hydroxyl group, and may include HCOOH, divalent aliphatic carboxylic acids represented by the formula of $HOOCR^9COOH$, wherein $R^9$ is a saturated or unsaturated aliphatic group having a carbon number of 1 to 8, which may have hydroxyl group, and aromatic carboxylic acids.

7. The surface treating agent according to claim 1, wherein said organic acid is at least one selected from the group consisting of acetic acid, lactic acid, succinic acid and salicylic acid.

8. The surface treating agent according to claim 1, wherein said polydimethylsiloxane has a viscosity at 25° C. of 10 to 200 cSt.

9. The surface treating agent according to claim 1, wherein said aqueous medium is at least one selected from the group consisting of water and aqueous organic solvents.

10. The surface treating agent according to claim 1, wherein 1 to 50 parts by weight of said organic acid, 1 to 500 parts by weight of said polydimethylsiloxane and 1,000 to 300,000 parts by weight of said aqueous medium are contained per 100 parts by weight of said amino group-containing polyorganosiloxane.

11. The surface treating agent according to claim 1, wherein said surfactant is present.

* * * * *